June 27, 1972 K. CORBACH 3,672,834
NUMERICAL POSITIONAL CONTROL
Filed Sept. 3, 1970 3 Sheets-Sheet 1

June 27, 1972   K. CORBACH   3,672,834
NUMERICAL POSITIONAL CONTROL
Filed Sept. 3, 1970   3 Sheets-Sheet 3

INVENTOR
KLAUS CORBACH
BY Werner St. Kleeman
ATTORNEY

United States Patent Office 3,672,834
Patented June 27, 1972

3,672,834
NUMERICAL POSITIONAL CONTROL
Klaus Corbach, Schaffhausen, Switzerland, assignor to Georg Fischer AG, Schaffhausen, Switzerland
Filed Sept. 3, 1970, Ser. No. 69,211
Claims priority, application Switzerland, Sept. 12, 1969, 13,787/69
Int. Cl. G06f 15/46
U.S. Cl. 235—151.11                     8 Claims

ABSTRACT OF THE DISCLOSURE

A numerical positioning control embodying a digital computer circuit means which can be influenced in sets by a program, this digital computer circuit means serving to generate a feed control signal for a second displaceable unit as a function of a signal corresponding to the independent feed of a first displaceable unit. The aforementioned computer circuit means determines during the duration of each program set, the path slope in the form of a ratio between both mentioned signals. Further, the digital computer circuit means embodies switching means which can be influenced in sets by the program and which, for the purpose of describing curved path sections, brings about during the duration of the set, automatic continuous changes of the programmed starting values of the path slope.

BACKGROUND OF THE INVENTION

The present invention broadly relates to improvements in numerical positional controls for machine tools, and specifically is directed to a new and improved numerical positioning control for at least two displaceable units or mechanisms of a machine tool for controlling the movement of one or a plurality of tools, wherein a first displaceable unit experiences an independent feed movement and the feed movement of a second displaceable unit is controlled in accordance with programmed information stored upon a data carrier as a function of the movement of the first displaceable unit.

With known numerical positioning controls effecting planar movements of either a tool or workpiece, the feed velocity of two displaceable units or carriers, normally disposed perpendicular to one another, is controlled by means of a control device through the agency of two adjustment members which are independent of one another. If the desired direction of movement does not coincide with the direction of displacement of one of the two displaceable units or carriers, then, the control device must match the adjustment signals in timewise relationship to one another for the adjustment members. A control system of this variety is quite complex and expensive.

Additionally, numerical positioning controls are known in which one of both displaceable units or carriers is moved with a predetermined feed velocity during the entire course of the machine program, whereas the movement of the second displaceable unit or carrier is controlled in accordance with the commands appearing upon a data carrier as a function of the momentary position of the first displaceable unit. Controls of this type are far less complex than those discussed above, and accordingly require less monetary expenditure. Still, they only permit a linear movement of the tool or workpiece. However, in order to perform curved, especially circular movements, which occur quite often in practice, up to now the curve contour had to be subdivided into a multiplicity of small linear sections, each of which had to be individually programmed. This required increased programming work and a corresponding rapid and expensive data input to the control.

SUMMARY OF THE INVENTION

Thus, a need exists in the art for a numerical positioning control which avoids the aforementioned drawbacks. It is a primary object of the present invention to provide such an improved numerical positioning control and to satisfy this need.

Another, more specific though equally important object of the instant invention is to provide an improved numerical control of relatively simple construction and wherein the data carrier can be programmed in the same manner as with known numerical positioning controls with linear and circular interpolators. Still a further significant objective of the present invention is the provision of a novel numerical positioning control which is relatively simple in construction, possesses only one adjustment member, can undertake the machining of both linear as well as circular contours, and can be programmed in the same manner as the known above-discussed numerical positioning controls with linear- and circle-interpolators.

Now, in order to implement these and still further objects of the invention, which will become more readily apparent as the description proceeds, the numerical positioning control of the invention is manifested by the features that there is provided a digital computer circuit means which can be influenced in sets by the program, this digital computer circuit means serving to generate a feed control signal for the second displaceable unit as a function of a signal corresponding to the independent feed. The aforementioned computer circuit means determining, during the duration of each program set, the path slope in the form of a magnitude ratio between both mentioned signals. Further, the digital computer circuit means embodies switching means which can be activated in sets by the program and which for the purpose of describing curved path sections brings about, during the duration of the set, automatic continuous changes of the programmed starting values of the path slope.

Such a control is relatively simple in construction, possesses only one adjustment member, can control the machining of both linear as well as circular contours, and is programmed in the same manner as the previously discussed known numerical positioning controls equipped with linear- and circle-interpolators.

BRIEF DESCRIPTION OF THE DRAWINGS

The invention will be better understood and objects and features other than those set forth above will become apparent when consideration is given to the following detailed description of preferred inventive embodiments. Such description making reference to the annexed drawing illustrating an exemplary embodiment of numerical positioning control for a lathe or other turning machine tool possessing two displaceable units, and wherein.

DETAILED DESCRIPTION OF THE PREFERRED EMBODIMENTS

Figure 1:
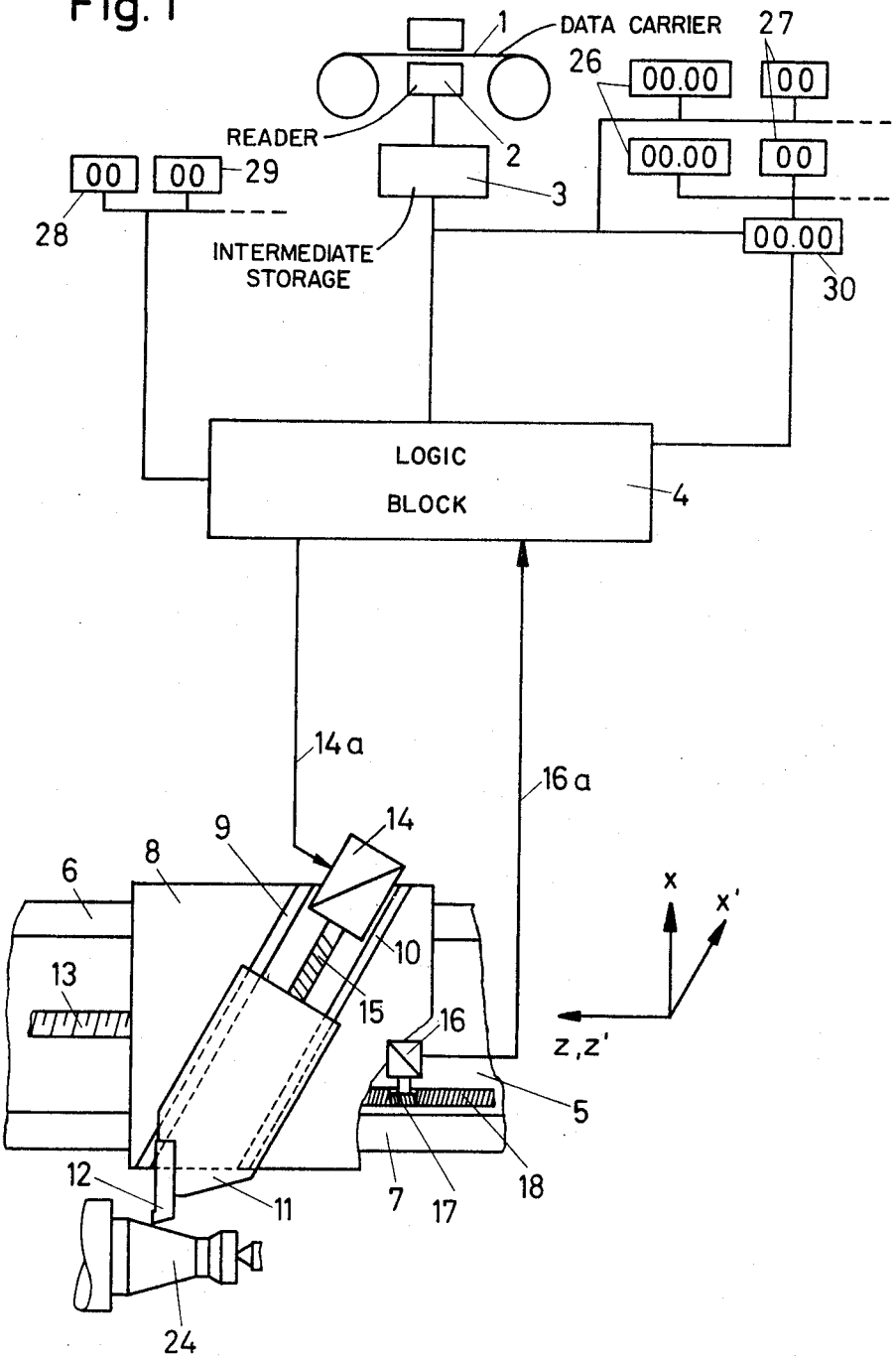
FIG. 1 schematically illustrates both displaceable units or carriers of a lathe or other turning machine tool and its associated control mechanism.

Describing now the drawings, in FIG. 1 there are shown the essential components or elements of a numerical control required for carrying out the described control function as well as several components of the controlled copying lathe or other turning machine tool. An information or data carrier 1, for instance a perforated tape, contains information concerning the switching operations as well as information regarding the desired path of movement of the machine tool. Details of the data carrier 1 and the processing thereof have not been here shown in order to preserve clarity in illustration. The desired path of travel information carried on the information or data carrier 1 is read into the control mechanism of the instant invention by a reading device or means 2 and is stored in the intermediate storage means 3. Upon command, such information is delivered to the logic block 4.

Regarding the actual machine tool, there is illustrated a machine bed 5 having the bed guides 6 and 7. A main carriage 8 is positioned to slide upon the bed guides 6 and 7. Further, the main carriage 8 is equipped with guide tracks 9 and 10, upon which there is guided the cross slide 11 supporting the actual machining or turning tool 12 or, as the case may be, a turret tool support, or equivalent type tool holder, having a plurality of tools. It should be understood that the angle between the direction of displacement of the primary or main carriage 8 and the direction of displacement of the cross slide 11 preferably amounts to 63.43°, so that the tangent in this case equals 2. During the course of the controlled program, the primary carriage 8 is driven by a standard feed drive through the agency of the threaded spindle 13, and specifically with a velocity or speed which is preselected for each program set.

The adjusting member for the cross slide 11 can be, for instance, a stepping motor 14 possessing a threaded spindle 15 acting either directly, or through the agency of a servo-system (not here shown) upon the cross slide 11. Instead of this type of arrangement, it would be course also be possible to use as the adjustment means other conventional servo drives provided for numerically controlled machine tools.

Continuing, it will be understood that a pulse generator 16 is provided at the main carriage 8, a drive pinion 17 of which meshes with a gear rack 18 provided at the machine bed 5. Pulse generator 16 measures displacement of the main carriage 8 with respect to the machine bed 5. Yet, it should be understood that to undertake this displacement measurement, other known displacement measuring systems can be used from that herein illustrated by way of example. The pulses from the pulse generator 16 are delivered via conductor or line means 16a to the logic block 4.

Figure 2:
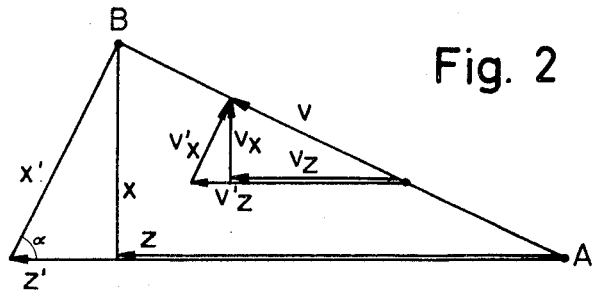
FIG. 2 schematically depicts the displacement conditions for the linear movement of the tool of FIG. 1 from point A to point B.
Figure 3:
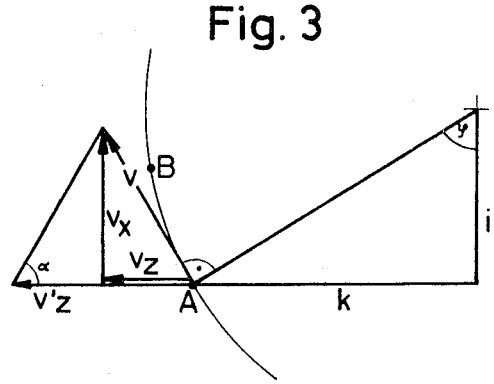
FIG. 3 schematically depicts the displacement conditions during the circular or curvilinear movement of the tool of FIG. 1 from point A to point B.

The principle of the numerical positional control is based upon the geometric relationships which can then be derived from the illustrations of FIGS. 2 and 3, during movement of the tool along a linear or arcuate path, respectively.

During the linear movement of the tool 12 from point A to point B as indicated in FIG. 2, with reference characters $z'$ and $x'$ designating the respective direction of movement of the primary carriage 8 and the cross slide 11, and with the tangent $\alpha=2$, the following relationships exist:

$$z = z' - \tfrac{1}{2}x \text{ or } v_z = v'_z - \tfrac{1}{2}v_x \text{ and } v_x = \frac{x}{z} \cdot v_z$$

By referring both to FIGS. 1 and 2, it should be understood that the values $v_x'$ designates the velocity of the cross slide 11 (coordinate direction $x'$), $v_z'$ the velocity of the primary carriage 8, and $v_x$ and $v_z$ the components of the velocity of movement of the tool 12 in the respective coordinate directions $x$ and $z$.

If these speeds of movement are counted in steps of, for instance, $\Delta x = \Delta z = 0.01$ mm., then, there are obtained the step frequenies:

$$f_x = v_x/\Delta x, \; f_z = v_z/\Delta z, \; f_z' = v_z'/\Delta z$$

Under the precondition that the pulse generator 16 delivers two pulses for each displacement path of 0.01 mm., its frequency $f$ is twice as great as the step frequency $f_z'$ of the primary carriage 8:

$$f = 2f_z'$$

By means of these equations there is defined the relationship between the step frequency $f$ of the primary carriage 8 determined by the program as the feed velocity and the step frequency $f_x$ which is to be produced from the data of the path of movement. This relationship can be expressed by the following equation.

$$f_x = f \frac{x}{2z + x}$$

When describing circular contours or shapes according to the FIG. 3, then corresponding to the changed geometric relationships for the step frequency relationship at the input and output of the control, there is obtained the function $$f_x = f \frac{k}{2i + k}$$

wherein $i$ and $k$ designate the central point coordinates of the circular shape, the starting value of which (with respect to point A) must be introduced into the program just as was the case for the values $x$ and $z$.

The ratio $f_x/f$ derived from both of the preceding equations is proportional to the slope of the path which, in the case of a straight line is constant, and in the case of a circular path of travel is variable in accordance with the continuously changing central point coordinates during movement through the curvilinear path.

Changes in sign of the displacement direction or rotational direction of the tool only require the sign to be changed in the above equations, therefore are of no significance for the functionality of the control.

Figure 4:
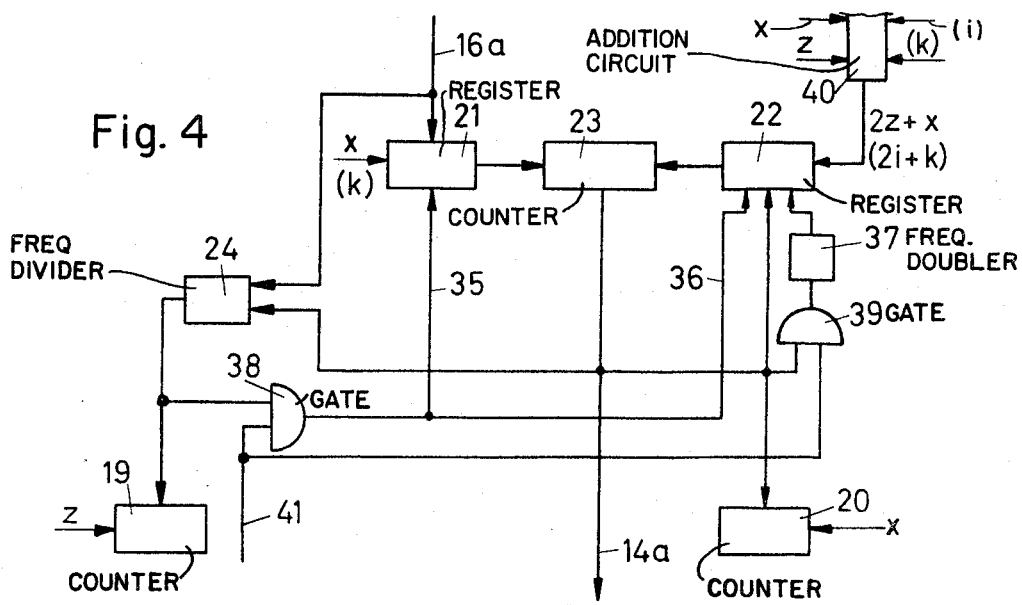
FIG. 4 is a block diagram of the logic portion of the numerical control mechanism.

One of the functions of the logic block 4 is to calculate the momentary step frequency $f_x$ of the cross slide 11, that is to say, the path slope, on the basis of the above equations from the step frequency $f$ of the primary carriage 8 delivered by the pulse generator 16 through the intermediary of the conductor 16a to this logic block 4. FIG. 4 is a circuit diagram showing the construction of this logic block 4 (interpolator) designed as a digital computer circuit.

When generating linear movements, there are introduced, always at the beginning of the set, the coordinates $z$ and $x$ of the displacement path to be traveled in the unit 0.01 mm., from the intermediate storage means 3 into the backward counters 19 and 20, respectively.

At the same time, the numerical values $x$ and $(2z+x)$, the latter value of which is formed in the addition circuit 40, are introduced into the registers 21 and 22, respectively. The contents of the register 22 with a negative sign is then transferred to the forward- and backward-counter 23.

The pulses delivered by the pulse generator 16 in accordance with the feed of the carriage 8, and possessing the step frequency $f$, are introduced into the register 21 via the conductor 16a. These pulses cause the content of this register 21, for each $f$-pulse, to be added once with a positive sign into the counter 23. The "overflow'" of this counter 23, that is, each sign change of the counter value from − to +, brings about the release of an $x$-pulse which is delivered via the conductor 14a to the adjustment member 14 for the purpose of carrying out a step of 0.01 mm. in the direction of the $x$-axis. Because of the inclined position of the cross slide 11, 1 step in the $x'$-direction amounts to 0.01114 mm.=0.01/sine 63.43° mm.

Additionally, each $x$-pulse causes the content of the register 22 to be again added with negative sign into the counter 23. To control the coordinate values at the end of the set the counters 19 and 20 are counted empty by the $f$- and $x$-pulses. Furthermore, with the help of the frequency divider 24 designed to provide a divider ratio of 2:1, and into which there are introduced the $f$-pulses with positive sign and the $x$-pulses with negative sign, there are formed according to the equation $$f_z = \tfrac{1}{2}(f - f_x)$$

the $z$-pulses necessary for counting empty the $z$-counter 19. Reference numerals 38 and 39 in FIG. 4 designate gates which remain blocked during program sets for linear movements.

In carrying out a circular or cudvilinear path of movement, instead of introducing the counter values $x$ and $(2z+x)$ into the registers 21 and 22, there are now introduced the counter values $k$ and $(2i+k)$, whereas in the backward counters 19 and 20 there are once again introduced the coordinates $z$ and $x$ of the final or object point $b$. Additionally, during a program set for circular shapes the gates 38 and 39 are opened through application of a programmed switching command to the conductor 41. As a result, during the running of the operation, the counter values of the registers 21 and 22, due to the travelled $x$ and $z$ step pulses, are continuously analogously corrected such that they correspond to the actual position of the tool at each moment of time with respect to the center of the circular path during travel through the programmed shape or contour. This occurs in the manner that each $z$-pulse, through the agency of the conductors 35 and 36, increases or decreases the content of the registers 21 and 22 by one counter unit depending upon the rotational sense of the circular or curvilinear contour, and additionally, each $x$-pulse changes the content of the register 22 by a respective 2 counter units through the agency of the frequency doubler 37. The remainder of the computer operation is performed during circular contours just as for straight lines.

In order to improve the understanding of the computer operation and the general functioning of the control system, there will now hereinafter be given a respective example for a linear path and a curvilinear path, from which there will be apparent the appearance of the $x$-step sequence.

EXAMPLE 1

Figure 5:
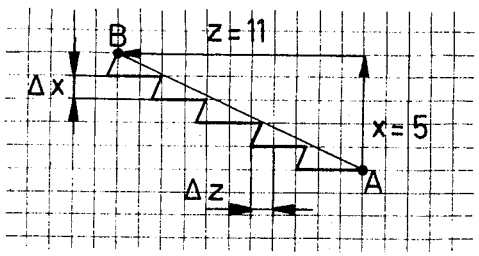
FIG. 5 graphically illustrates an exemplary movement for the tool when undergoing a linear displacement path.

[Corresponds to Figure 5—linear displacement path]
Programmed Path Information: $x=5, z=11$

| $f$ Imp. Nr. | Registers 21 and 22 | | Counter 23 | $f_z$ | $f_x$ | Counters 19 and 20 | |
|---|---|---|---|---|---|---|---|
| | $x$ | $2z+x$ | | | | $z$ | $x$ |
| Beginning of set | 5 | 27 | −27 | | | 11 | 5 |
| 1 | 5 | 27 | −22 | 0 | 0 | 11 | 5 |
| 2 | 5 | 27 | −17 | 1 | 0 | 10 | 5 |
| 3 | 5 | 27 | −12 | 0 | 0 | 10 | 5 |
| 4 | 5 | 27 | − 7 | 1 | 0 | 9 | 5 |
| 5 | 5 | 27 | − 2 | 0 | 0 | 9 | 5 |
| 6 | 5 | 27 | + 3−27=−24 | 1 | 1 | 8 | 4 |
| 7 | 5 | 27 | −19 | 0 | 0 | 8 | 4 |
| 8 | 5 | 27 | −14 | 1 | 0 | 8 | 4 |
| 9 | 5 | 27 | − 9 | 1 | 0 | 7 | 4 |
| 10 | 5 | 27 | − 4 | 0 | 0 | 7 | 4 |
| 11 | 5 | 27 | + 1−27=−26 | 1 | 1 | 6 | 3 |
| 12 | 5 | 27 | −21 | 0 | 0 | 6 | 3 |
| 13 | 5 | 27 | −16 | 0 | 0 | 6 | 3 |
| 14 | 5 | 27 | −11 | 1 | 0 | 5 | 3 |
| 15 | 5 | 27 | − 6 | 0 | 0 | 5 | 3 |
| 16 | 5 | 27 | − 1 | 1 | 0 | 4 | 3 |
| 17 | 5 | 27 | + 4−27=−23 | 0 | 1 | 4 | 2 |
| 18 | 5 | 27 | −18 | 0 | 0 | 4 | 2 |
| 19 | 5 | 27 | −13 | 1 | 0 | 3 | 2 |
| 20 | 5 | 27 | − 8 | 0 | 0 | 3 | 2 |
| 21 | 5 | 27 | − 3 | 1 | 0 | 2 | 2 |
| 22 | 5 | 27 | + 2−27=−25 | 0 | 1 | 2 | 1 |
| 23 | 5 | 27 | −20 | 0 | 0 | 2 | 1 |
| 24 | 5 | 27 | −15 | 1 | 0 | 1 | 1 |
| 25 | 5 | 27 | −10 | 0 | 0 | 1 | 1 |
| 26 | 5 | 27 | − 5 | 1 | 0 | 0 | 1 |
| 27 | 5 | 27 | + 0 | 0 | 1 | 0 | 0 |

End of set

EXAMPLE 2

Figure 6:
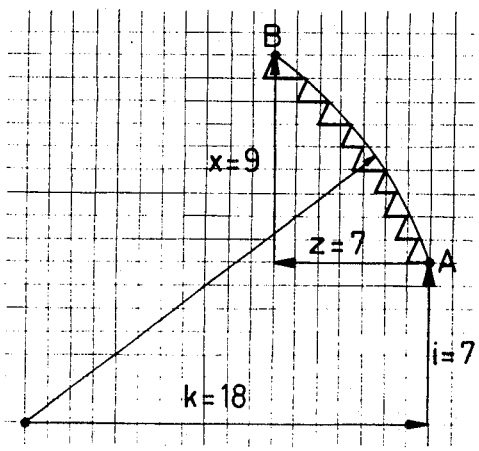
FIG. 6 graphically illustrates an exemplary tool movement when undergoing a displacement through a circular or arcuative path.

[Corresponds to Figure 6—curvilinear displacement path]
Programmed Path Information: $x=9, z=7, i=7, k=18$ Direction of rotation to left

| $f$ Imp. Nr. | Registers 21 and 22 | | Counter 23 | $f_z$ | $f_x$ | Counters 19 and 20 | |
|---|---|---|---|---|---|---|---|
| | $k$ | $2i+k$ | | | | $z$ | $x$ |
| Beginning of set | 18 | 32 | −32 | | | 7 | 9 |
| 1 | 18 | 32 | −14 | 0 | 0 | 7 | 9 |
| 2 | 17 | 33 | + 4−33=−29 | 1 | 1 | 6 | 8 |
| 3 | 17 | 33 | −12 | 0 | 0 | 6 | 8 |
| 4 | 17 | 35 | + 5−35=−30 | 0 | 1 | 6 | 7 |
| 5 | 17 | 35 | −13 | 0 | 0 | 6 | 7 |
| 6 | 16 | 36 | + 4−36=−32 | 1 | 1 | 5 | 6 |
| 7 | 16 | 36 | −16 | 0 | 0 | 5 | 6 |
| 8 | 16 | 38 | + 0−38=−38 | 0 | 1 | 5 | 5 |
| 9 | 16 | 38 | −22 | 0 | 0 | 5 | 5 |
| 10 | 15 | 37 | − 6 | 1 | 0 | 4 | 5 |
| 11 | 15 | 39 | + 9−39=−30 | 0 | 1 | 4 | 4 |
| 12 | 15 | 39 | −15 | 0 | 0 | 4 | 4 |
| 13 | 14 | 40 | + 0−40=−40 | 1 | 1 | 3 | 3 |
| 14 | 14 | 40 | −26 | 0 | 0 | 3 | 3 |
| 15 | 14 | 40 | −12 | 0 | 0 | 3 | 3 |
| 16 | 13 | 41 | + 2−41=−39 | 1 | 1 | 2 | 2 |
| 17 | 13 | 41 | −26 | 0 | 0 | 2 | 2 |
| 18 | 13 | 41 | −13 | 0 | 0 | 2 | 2 |
| 19 | 12 | 42 | + 0−42=−42 | 1 | 1 | 1 | 1 |
| 20 | 12 | 42 | −30 | 0 | 0 | 1 | 1 |
| 21 | 12 | 42 | −18 | 0 | 0 | 1 | 1 |
| 22 | 11 | 41 | − 6 | 1 | 0 | 0 | 1 |
| 23 | 11 | 43 | + 5 | 0 | 1 | 0 | 0 |

End of set

The velocity of the tool 12 along the path can be derived from the feed velocity of the primary carriage 8 and the slope of the curve or contour. The primary carriage feed is preselected in sets by means of switching data.

The guide tracks 9 and 10, together with the cross slide 11 can be pivotably arranged upon the primary carriage 8. Thus, it would be possible to initiate pivotal movements into different angular positions with respect to the direction of movement of the primary carriage ($z$-direction) by means of programmed switching commands. In preferred angular positions, such as 90° or a position through 90° symmetrical to the position of FIG. 1 (wherein tangent $\alpha = -2$) the positional control incorporating the circuitry of FIG. 4 can operate in analogous manner to that described by merely performing a simple programable switching operation. Consequently, it is possible to move the turning tool 12 in the $x$–$z$-plane in every optional direction.

The control is designed to automatically carry out complete displacement cycles consisting of a number of successive program sets. The devices required to achieve this end will be described hereinafter.

(1) Null point

The programed contour or shape relates to a selectable, machine-fixed coordinate-null or zero point which can be determined by machine-fixed null point cams and null pulses of the displacement path-measuring system of both displacement axes. Upon operating a push button "null point-cycle step" the cross slide travels to its null point. Thereafter, the primary carriage is caused to move at a normal feed until it reaches the $z$-null point. The signal "$z$-null point reached" triggers the start of the first set of the program cycle.

(2) Manual set input

It is possible to introduce manually at the decade switches or counters 26 (FIG. 1) the $x$- and $z$-coordinates of an additional set which can be triggered during preselection of the relevant mode of operation by the button "cycle-start." Thus, it is possible to provide different starting points for the program cycle from the machine fixed null point.

(3) Tool corrections

The system provides two different types of corrections:

(a) The "tool-cut correction" constitutes a correction of the tool position which is undertaken prior to beginning the machining operation and is maintained during the machining or cutting operation or travel of the tool. The degree of correction in both axes ($z$- and $x$-direction) amounts to, for instance, a maximum of 1 mm. This correction is introduced through the agency of the tool-cutting correction-decaded switch 27, there being provided two or more pairs, and undertaken during a feed direction change in an intermediate set as well as when carrying out a manually introduced set. In so doing, a previously provided correction is expunged. By means of the program (1st set of a new cutting cycle) there is associated with each correction pair a predetermined cut or tool.

(b) The "tool-set correction" is the correction of the tool position, which, triggered by a programed auxiliary function, is carried out at the beginning of a set and at the end of a set is automatically again expunged or eliminated. This correction only concerns the $x$-position of the tool and at a maximum amounts to 0.1 mm. This serves as an individual diameter correction for certain sets (for instance a press fit) within a cutting operation. The infeed of the predetermined set correction values associated with the sets occurs at the decade switches 28 and 29.

(4) Reversal of direction of the primary carriage movement

If during the running of the automatic cycle there appears a sign change of the $z$-value at the program intermediate storage means 3, then, by means of the signal "end of set" the feed movement is automatically switched-off. The $z$-stepping pulses which are still delivered at the end of the set until the carriage comes to standstill are counted into an overflow counter 30. The next program set is only then initiated if thereafter the primary carriage which is moved in the opposite direction has again counted empty the overflow counter 30.

The above-discussed tool cut correction is carried out during the reversal of the direction of movement of the primary carriage in that the cross slide 11 carries out the introduced $x$-correction steps during standstill of the primary carriage 8 and the introduced $z$-correction value is added or subtracted from the value in the overflow counter 30.

(5) Production of undercut portion at workpiece shoulders

Figure 7:
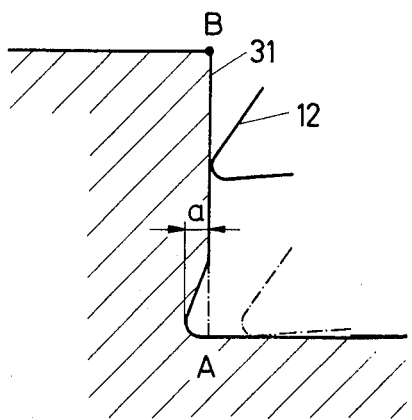
FIG. 7 illustrates the formation of an undercut portion at a shoulder of the workpiece.

It is possible to produce shoulder undercuts of the type shown in FIG. 7, by receiving and retaining the $x$-pulses delievred by the control for producing a linear shoulder indicated by the line between the points A–B, in a non-illustrated storage means, through the agency of a switch controlled by a programmed switching function, for such length of time and in such number until the tool 12 has reached the required undercut depth $a$. Thereafter, the stored displacement steps of the adjustment motor 14 are made up by carrying out a maximum feed or advancing speed of the cross slide 11, with the tool 12 therefore being returned back to the position of the programed workpiece shoulder 31. Thereafter, there is undertaken completion of the set for the remainder of the vertical portion of the shoulder.

While there is shown and described present preferred embodiments of the invention, it is to be distinctly understood that the invention is not limited thereto but may be otherwise variously emboided and practiced within the scope of the following claims.

What is claimed is:

1. In a numerical positioning control in conjunction with at least two displaceable units of a machine tool for controlling the movement of at least one tool, wherein a first of such displaceable units undergoes an independent feed movement and the feed movesment of the second displaceable unit is controlled in accordance with a program stored upon a data carrier as a function of the movement of said first displaceable unit, the improvement comprising digital computer circuit means influenced in sets by the program for generating a feed control signal for said second displaceable unit on the basis of a signal corresponding to the independent feed movement of said first displaceable unit and introduced to said digital computer circuit means, said digital computer circuit means determining, during the duration of each program set, the path slope in the form of a ratio between both mentioned signals, said computer circuit means incorporating switching means capable of being actuated in sets by said program, said switching means bringing about an automatic progressive change of the program starting values of the path slope during the duration of the set for the purpose of moving the tool along curved path sections.

2. The improvement defined in claim 1, wherein said computer circuit means embodies means for receiving programed positional information representative of the values of the position path-terminal points along coordinates disposed perpendicular to one another and the central point coordinates for circular-shaped path sections.

3. The improvement defined in claim 1, further including pulse generator means possessing a pule frequency of 200 pulses per 1 mm. displacement of said first displaceable unit for scanning the movement of said first displaceable unit, the respective direction of movement of both said displaceable units being arranged with respect to one another to enclose an angle therebetween, the tangent of which amounts to the value 2.

4. The improvement defined in claim 3, further including overflow counter means for counting the displacement path pulses of said pulse generator means delivered after switching-off the feed of said first displaceable unit.

5. The improvement defined in claim 1, further including means enabling the positional control to carry out automatic performance of complete program cycles consisting of a number of successive program sets with directional change of the displaceable units in optional positions programed at the data carrier.

6. The improvement defined in claim 5, further including means for automatically correcting the tool position during the course of the program cycle and which can be manually adjusted at decade switch means.

7. The improvement defined in claim 1, further including decade switch means for manually infeeding an individual program set.

8. The improvement as defined in claim 1, further including program-control switch means for performing undercuts at perpendicularly extending shoulders of a workpiece.

References Cited

UNITED STATES PATENTS

| | | | |
|---|---|---|---|
| 3,254,203 | 5/1966 | Kveim | 235—151.11 X |
| 3,538,315 | 11/1970 | Reuteler | 235—151.11 |
| 3,525,917 | 8/1970 | Leenhouts | 318—570 |
| 3,422,325 | 1/1969 | Gerber et al. | 318—574 |
| 3,559,021 | 1/1971 | Bingham, Jr. | 318—568 |
| 3,548,281 | 12/1970 | Anis | 318—569 |
| 3,549,871 | 12/1970 | Okamoto et al. | 235—92 MP X |
| 3,174,367 | 3/1965 | Lukens | 235—92 MP UX |

EUGENE G. BOTZ, Primary Examiner

J. SMITH, Assistant Examiner

U.S. Cl. X.R.

235—92 MP; 318—568, 569